United States Patent [19]

Wilson

[11] 4,279,624
[45] Jul. 21, 1981

[54] DOWNFLOW SEPARATOR METHOD AND APPARATUS

[76] Inventor: Joseph G. Wilson, 15 Weston Hill Rd., Riverside, Conn. 06878

[21] Appl. No.: 92,343

[22] Filed: Nov. 8, 1979

Related U.S. Application Data

[63] Continuation of Ser. No. 947,173, Sep. 28, 1978, abandoned.

[51] Int. Cl.³ .............................................. B01D 45/12
[52] U.S. Cl. ........................................ 55/1; 55/347; 55/396; 55/416; 55/426; 55/431; 55/457; 55/267; 209/144
[58] Field of Search ............... 55/1, 17, 267, 347–349, 55/396, 410, 416, 426, 428, 431, 448–450, 452, 456, 457, 459 R, 269; 209/144

[56] References Cited

U.S. PATENT DOCUMENTS

| | | | |
|---|---|---|---|
| 1,338,143 | 4/1920 | McGee | 55/347 |
| 2,010,456 | 8/1935 | Jones | 55/426 |
| 2,117,718 | 5/1938 | Hawley | 55/426 |
| 2,790,554 | 4/1957 | Work | 55/428 |
| 2,941,621 | 6/1960 | Dygert et al. | 55/321 |
| 2,976,130 | 3/1961 | Hedberg et al. | 55/348 |
| 2,986,278 | 5/1961 | Bjorklund | 209/144 |
| 3,019,856 | 2/1962 | Patterson | 55/449 |
| 3,066,854 | 12/1962 | Beins et al. | 230/202 |
| 3,137,133 | 6/1964 | Wilson et al. | 60/39.02 |
| 3,139,726 | 7/1964 | Wilson et al. | 60/39.02 |
| 3,212,240 | 10/1965 | Streete | 55/457 |
| 3,415,042 | 12/1968 | Wilson | 55/348 |
| 3,443,368 | 5/1969 | Wilson et al. | 55/435 |
| 3,541,766 | 11/1970 | Wilson | 55/348 |
| 3,554,903 | 1/1971 | Wilson | 208/164 |
| 3,631,657 | 1/1972 | Wilson | 55/348 |
| 3,885,934 | 5/1975 | Eads et al. | 55/457 |
| 3,895,930 | 7/1975 | Camdolong | 55/426 |

FOREIGN PATENT DOCUMENTS

762070 11/1956 United Kingdom ................ 55/267

Primary Examiner—David L. Lacey
Attorney, Agent, or Firm—Parmelee, Johnson, Bollinger & Bramblett

[57] ABSTRACT

A centrifugal separator has an outer tube and an inner tube concentrically positioned therein, forming an annular gas inlet channel between the outer and inner tubes, and slots are defined in the inner tube to provide communication between this annular channel and the space within the inner tube. A collection chamber for collecting particulate matter and for allowing the flow of bleed gases is provided towards the bottom of the annular channel. Transverse discharge means communicate with the collection chamber for removing material therefrom. The separator includes at least one swirling vane for imparting swirling motion to gas flowing in the annular channel. Separation of particulate matter from the swirling gas due to centrifugal force occurs when the gas initially enters the annular channel and as the gas swirls within the annular channel. Further separation of particulate matter occurs when the swirling gas in the channel experiences a sudden change in flow direction during entry into the slots in the inner tube. Clean gas discharge means are provided at the bottom of the inner tube so that clean gas exits the separator from below. A plurality of such centrifugal separators are mounted in a pair of upper and lower parallel tube sheets located within a separator vessel. The tube sheets define a main separation chamber therebetween, with a gas inlet chamber thereabove, and a clean gas discharge chamber therebelow. Gas containing particulate matter enters the inlet chamber of the vessel from above, passes directly down into the multiple separators in the separation chamber, and is discharged downwardly through the bottom discharge chamber. Means to remove separated particulate matter and bleed gas from the separation chamber are provided.

35 Claims, 12 Drawing Figures

DOWNFLOW SEPARATOR METHOD AND APPARATUS

RELATED APPLICATION

This application is a continuation of prior copending application Ser. No. 947,173, filed Sept. 28, 1978, and now abandoned.

BACKGROUND OF THE INVENTION

This invention relates to an improved method and apparatus for separating particles from gases by use of centrifugal separators. It is particularly useful for separating particles of catalyst from hydrocarbon vapors issuing from a catalytic cracking process and can also be advantageously utilized in other applications such as for removing suspended solids from gases fed to boilers, resulting from coal gasification and liquefaction, molecular separation; and for use with supercharged boilers.

In a catalytic cracking process, particle separators embodying the present invention are especially useful in "third stage" separation, that is, in separation of relatively smaller particles from gas after the relatively larger particles have already been removed by cyclone separators. Third stage separation is quite important for air pollution control purposes and for economizing. Some active catalyst can advantageously be recovered and re-used by this mode of separation. Furthermore, purified clean gas from this third stage separation can be used to drive a turbine without any significant erosion of the turbine blades which would otherwise be caused if such particles were still present in the gas being fed to the turbine.

Centrifugal separators of the type having an outer tube and a concentric inner tube defining an annular passageway therebetween are known to the art. In U.S. Pat. No. 3,443,368, of which I am a co-inventor, a centrifugal separator of the above type is described. The inner tube, which also acts as a clean gas discharge line, has an open-mouthed end extending into the region defined within the outer tube. The inner surface of the outer tube is lined with refractory ceramic.

In operation, gas laden with particulate matter enters the annular passageway in a swirling motion generated by swirl vanes associated with the separator. Centrifugal force throws the particulate matter in the gases outwardly against the inner surface of the outer tube. These particles, along with some bleed gas, enter a narrow annular trough at the bottom of the separator and are discharged therefrom. The clean gas, now in a purified state, flows up into the open mouth lower end of the inner (clean gas discharge) tube and ascends upwardly, exiting the separator at the top.

In my U.S. Pat. No. 3,631,657, an apparatus for cleaning gas comprising an inner vessel enclosed within an outer vessel is disclosed. The inner vessel is partitioned into a clean gas chamber, an intermediate inlet chamber and a particle collection chamber. Gas to be purified is fed into the intermediate inlet chamber, which contains a plurality of centrifugal separators, as for example, those shown in the above-mentioned U.S. Pat. No. 3,443,368.

The bottoms of the separators communicate with the particle collection chamber to deposit the separated particles therein. The inner clean gas discharge tube of the several separators direct the clean gas upwardly into the clean gas discharge chamber. The purified gas flows through holes in the sidewall of this chamber, into the space defined between the inner and outer vessel, and is discharged from the apparatus through an outlet nozzle associated with the outer vessel.

U.S. Pat. No. 2,941,621 shows another embodiment of a known centrifugal separator including an outer tube and an inner clean gas discharge tube positioned concentrically therein. Gas to be purified enters an annular channel defined between the inner and outer tubes with a swirling motion imparted by swirl vanes. The separated particles and bleed gases flow down to the bottom of the outer tube and are discharged therefrom while the purified clean gas ascends through the inner discharge tube and exits the separator from above. A similar separator is also disclosed in U.S. Pat. No. 3,006,854.

A plurality of such separators are included within a single vessel partitioned into a center inlet chamber which supports the separators and communicates with the incoming gas to be purified, a lower collecting chamber in communication with the bottom of the separators for receiving discharged particles and bleed gas, and an upper clean gas outlet chamber in communication with the inner discharge tube for receiving purified gas. Duct means are provided for bypassing the upper clean gas discharge chamber and introducing the gas to be purified directly into the central separation chamber.

The prior art centrifugal separators also experienced erosion problems caused by the recycling of the separated particles. That is, even after particles were separated from the gas, these particles were still trapped within the separators and subjected to turbulent forces causing them forcefully to impact against and continue to churn against the walls of the separator, resulting in severe erosion.

Also, because the purified gas exits from the top of the separator while the separated particles and bleed gas exit from the bottom of the separator, the disclosed prior art separator vessel, must, by necessity, position the clean gas discharge chamber above the separators, and position the collecting chamber below the separators. Thus, the chamber in which the separators are housed must be positioned between the upper and lower chambers thereby requiring the complex arrangement of a separate air inlet duct means to transport the particle-laden gas through the upper clean gas discharge chamber for introduction into the separation chamber of the vessel.

It is an object of the present invention to provide an improved separator, separator vessel and method of separation overcoming the disadvantages of the known prior art. Specifically, the present invention provides a simplified, economical and durable separator and separator vessel which is highly efficient and easy to maintain. Moreover, a novel method of separating particles from gases is provided.

SUMMARY OF THE INVENTION

A centrifugal separator embodying the present invention includes a greater diameter metallic outer tube and a smaller diameter metallic inner tube concentrically positioned therein and extending longitudinally within the outer tube. The inner tube has a closed top and an open bottom. An annular channel is defined between the outer surface of the inner tube and the inner surface of the outer tube. This channel has an open top for receiving gas, and a closed bottom. A plurality of swirl vanes are positioned proximate to the top of this annular channel for imparting a swirling movement to gas within the annular channel.

The inner tube has a series of angled slots which are directed inwardly towards the center of this tube providing communication between the annular channel and the space within the inner tube. These slots cause a sudden change in the direction of flow of the swirling gas which passes from the annular channel inwardly through the slots and into the inner tube.

Towards the bottom of the annular channel, an annular collection chamber is defined between the inner surface of the outer tube, the outer surface of the inner tube, a lower annular closure, and an upper annular ridge positioned above the closure. This annular ridge extends transversely from the outer surface of the inner tube in a direction towards the inner surface of the outer tube. Its radial extent is slightly smaller than the difference of the diameters of the outer and inner tubes. Thus, the outer rim of the ridge and the inner surface of the outer tube form a narrow passageway leading downwardly into the collection chamber.

The ridge may also include anti-swirl vanes (or blades) which extend across the opening of the narrow passageway for converting velocity head into pressure head. That is, a predetermined percentage of the gas swirling in the annular channel is forcefully directed into the small enclosed bottom collection chamber to increase the pressure therein.

Discharge means, such as a discharge port or a discharge pipe, through the outer tube communicate with the above-described lower annular collection chamber for providing means for removing material from that chamber.

In operation, gas laden with particles enters the top of the annular channel. The associated swirl vanes produce a swirling flow of gas. Centrifugal force propels the larger particles against the inner surface of the outer tube. These separated particles descend down the inner surface, and together with some bleed gas, enter the lower annular collection chamber from which they are discharged via the discharge means associated with the collection chamber. As the gas swirls down the annular channel and makes further revolutions, additional particulate matter is centrifugally separated therefrom.

After the aforementioned centrifugal separation of the larger and intermediate size particles have occurred in the length of the separating annulus of the annular channel, the partially purified gas swirling downwardly in the annular channel reaches the slots in the inner tube. The slots are so angled that the gas in passing from the annular channel into the inner tube takes a sudden change in direction of flow as it enters the slots. This change in direction and sudden inward flow causes smaller particles (which were not initially separated from the gas) to be left within the annular channel while the main flow of gas enters the inner tube and flows downwardly through its open bottom portion. The smaller particles remaining in the annular channel descend into the lower annular collection chamber, thus completing the additional stage of separation.

The purified gas leaves each of the separators from the bottom thereof and the separated particles and bleed gas leaves the annular collection chamber in a transverse direction. Thus, it is possible to include a plurality of these separators in an enclosed separator vessel and introduce the gas to be purified directly into the top of the vessel. This is not possible in the previously discussed equipment of the prior art because the known separators disclosed therein discharge purified gas in an upward direction. This prior art structure required that the upper chamber be reserved for clean gas discharged from the separators, and necessitated the use of an intermediate chamber as an gas inlet chamber, thereby requiring the vessel to include duct means for transporting the gas to be purified through the upper clean gas to be introduced into the intermediate gas inlet chamber.

In addition to eliminating the need for such duct means, the advanatageous arrangement of having the gas inlet chamber at the top of the separator vessel without any such interfering duct allows easy access to the separator tubes for inspection of maintenance purposes, thus rendering it easy to assemble and disassemble the vessel.

By virtue of the fact that the separated particles and bleed gas leave the separators in a lateral direction, the purified gas can advantageously be discharged from the separator vessel in a downward direction and still avoid remixing with the separated particles.

Further features, aspects and advantages of the present invention will become more fully understood from the following detailed description of a preferred embodiment in conjunction with the accompanying drawings.

BRIEF DESCRIPTION OF THE DRAWINGS

FIG. 3 is drawn on a much smaller scale than FIGS. 1 and 2, and it shows an elevational sectional view and flow diagram of a centrifugal separator vessel including a plurality of centrifugal separators of the type shown in FIG. 1, FIGS. 4A and 4B are plan views which illustrate two typical arrangements of a plurality of centrifugal separators mounted in the separating vessel of FIG. 3, FIGS. 5A, 5B, 5C, 5D and 5E are enlarged cross sectional views taken through the inner tube of a centrifugal separator as drawn in FIG. 1 showing various advantageous configurations of the slots in the inner tube of the separator of FIG. 1.

DESCRIPTION OF THE PREFERRED EMBODIMENT

Figure 1:
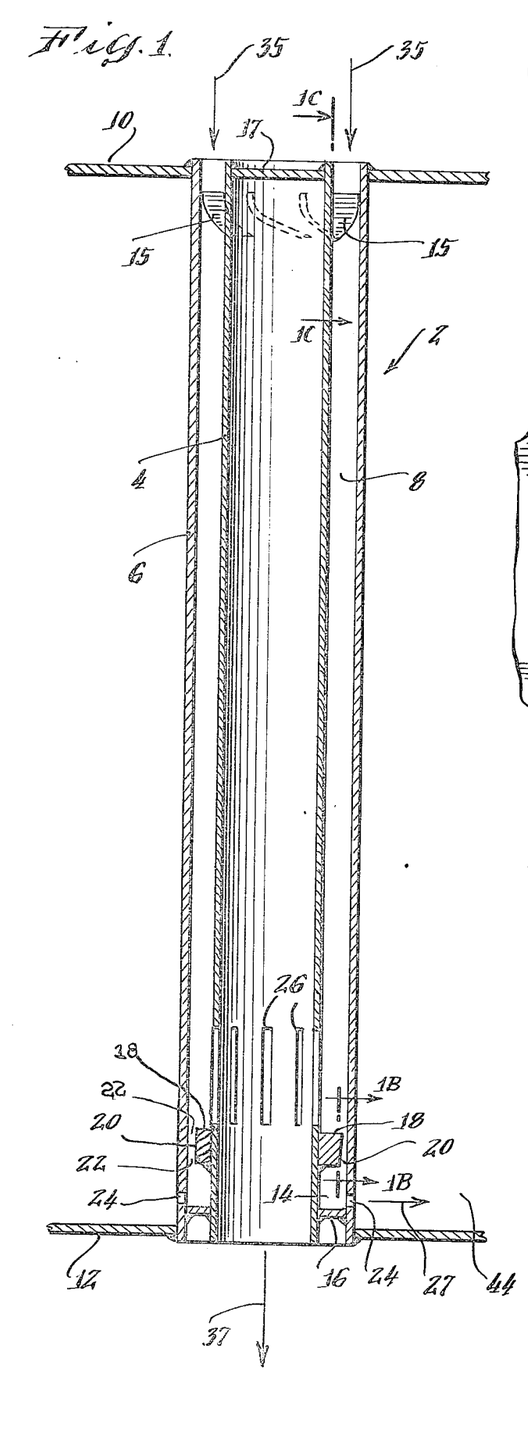
FIG. 1 shows an elevational sectional view of a centrifugal separator constructed in accordance with the present invention.

Referring to FIG. 1 of the drawings, a centrifugal separator constructed in accordance with the present invention is indicated generally by the numeral 2. This separator comprises a generally cylindrical inner tube 4 concentrically poisitioned within a generally cylindrical outer tube 6. The inner tube extends in the longitudinal direction in the outer tube. An annular channel 8 for receiving a flowing stream of gas is defined between the inner surface of the outer tube and the outer surface of the inner tube.

A pair of supporting tube sheets 10 and 12 are positioned, respectively, towards the top and bottom of the centrifugal separator. These tube sheets receive and hold the upper and lower ends of the separator. An upper circular closure piece 17 effectively seals the top of the inner tube while leaving the top of the annular channel 8 unobstructed. A lower annular partition 16 seals the bottom of the annular channel but leaves the lower end of the inner tube unobstructed.

In the preferred embodiment as shown in FIG. 1, the top and bottom tube sheets, the upper closure piece, the lower annular partition, and the inner and outer tubes are formed of metal. Using such metal components renders the separator inexpensive to manufacture as compared to ceramic-lined units as often required by the prior art. The metallic tubes may be surface hardened to reduce erosion.

Advantageously, the upper and lower tube sheets 10 and 12 with the multiple centrifugal separators 2 extending between these two sheets and secured to them provides a rigid truss-like structure which strongly resists downward bending, sagging or distortion. The vertically-spaced twin sheets 10 and 12 act like upper and lower webs of a truss structure, with the separators 2 acting like struts between these webs. Consequently, the respective horizontally-extending tube sheets 10 and 12 can be made relatively thin as compared with prior art structures of comparable diameter, and yet the overall drum-like assembly 10, 12 and 2 is relatively strong and can readily be supported like a basket from its perimeter by means of the support member 54 to be described further below.

The centrifugal separator 2 includes a series of associated swirl vanes 15 positioned in the annular channel 8 towards the top thereof for generating a swirling movement of gas within this annular channel. In the alternative, a tangential gas entrance to the annular channel 8 can be provided for generating swirling motion of the gas in that channel.

An annular collection chamber 14 for collecting separated particles and for allowing the flow of bleed gas is located in the lower portion of the annular channel 8. This collection chamber is defined by the lower partition 16, the outer surface of the inner tube 4, the inner surface of the outer tube 6, and a ridge member 18 mounted on the inner tube and having an outer rim 20 closely spaced from the outer tube. The lower partition, which bridges across horizontally between the inner tube and the outer tube in a direction perpendicular to the surfaces of these tubes, defines the closed bottom of the collection chamber.

Figure 1A:
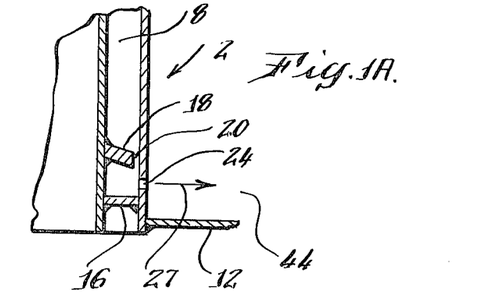
FIG. 1A shows a portion of the separator of FIG. 1 including a modification.

The ridge 18 is positioned above the partition 16 at the top of the collection chamber and extends transversely from the outer surface of the inner tube 4 towards the inner surface of the outer tube 6. The radial extension of this ridge member is slightly less than the difference between the inner diameter (I.D.) of the outer tube and the outer diameter (O.D.) of the inner tube. Thus, the rim 20 of this ridge 18 and the inner surface of the outer tube 6 define a narrow passageway 22 therebetween which leads downwardly into the collection chamber 14. The ridge itself can be either transverse or sloped downwardly and outwardly, as shown in FIG. 1A, relative to the surfaces of the inner and outer tubes.

If desired, anti-swirl vanes 19, may be provided extending into the area of the passageway 22, and being carried by the ridge 18. These anti-swirl vanes convert velocity head, i.e. momentum of the swirling gas in annular channel 8, into pressure head to create a pressure differential between the interior of the collection chamber 14 and the region 44 outside of the outer tube to prevent back-up of separated particulate matter, and to prevent the coupling of adjacent separators.

A discharge port 24 is formed in the wall of the outer tube 6 communicating with the lower portion of the collection chamber 14. Particulate material which has accumulated within the collection chamber 14 is removed therefrom via this port 24. The discharge port is of a sufficient size to maintain a 0.1 to 0.15 psi pressure differential between the gas within the collection chamber 14 and the region 44 outside of the outer tube. The relative size of the ports 24 controls the amount of bleed gas 27 discharged from the individual collection chambers 14 into the common chamber 44 (See FIGS. 1 and 3).

The arrows 27 indicates the outward flow of bleed gas carrying within itself the accumulated particulate matter being removed from the collection chamber 14. By virtue of the fact that the pressure within the chamber 44 is purposefully maintained at a predetermined differential pressure, e.g. 0.1 to 0.15 psi, below the pressure in the upstream chamber 14, the flow 27 does not inadvertently reverse in the event of small pressure differences among chambers 14 in a plurality of separator tubes 2.

As will be explained further below, a criticalflow nozzle 52 located downstream from the port 24 serves to control the total mass flow of bleed gas from all of the separator tubes 2, each individual port 24 contributing its proportionate share to the total mass flow of the bleed gas 55. The pressure differential across each port 24 is controlled by the mass of bleed gas flowing through that port, which is itself controlled by the total mass of bleed gas 55 flowing through critical nozzle 52. This will be a constant value for a given set of operating conditions.

A series of slots 26 are defined in the inner tube 4. These slots allow gas swirling within the annular channel 8 to enter into the inner tube, producing a sudden change in direction of flow, causing the flow suddenly to turn inwardly into the inner tube. It is believed that more efficient results are obtained when the slots are positioned as shown below the approximate longitudinal center of the inner tube 4.

Figure 5A:
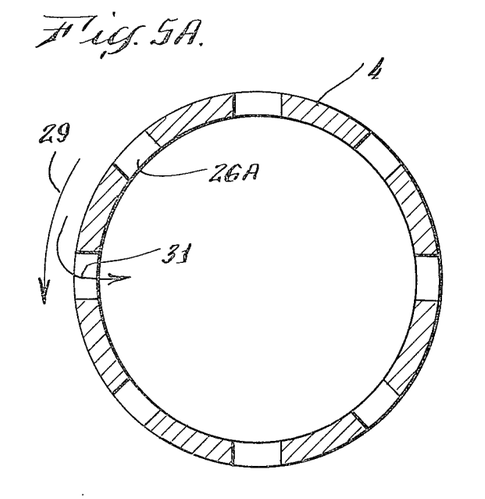
Figure 5B:
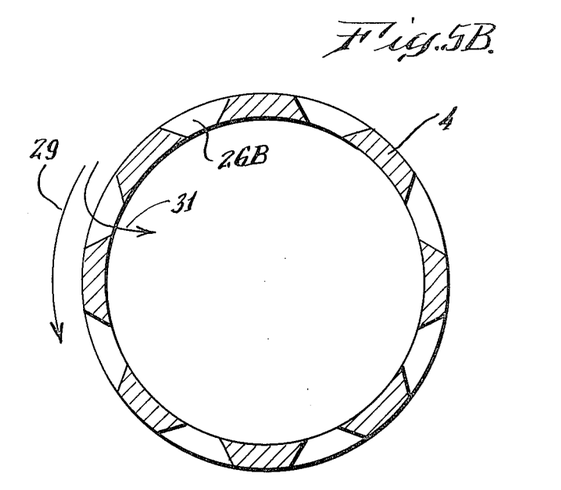
Figure 5C:
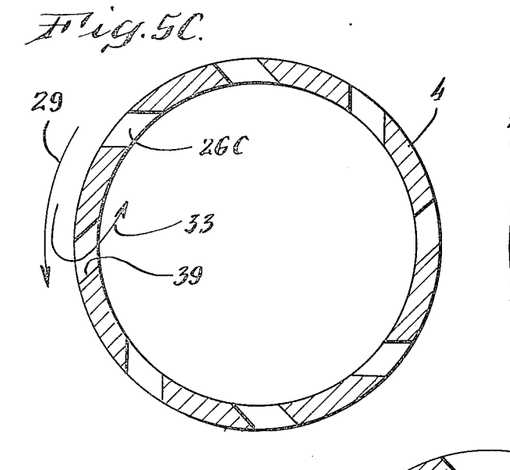
Figure 5D:
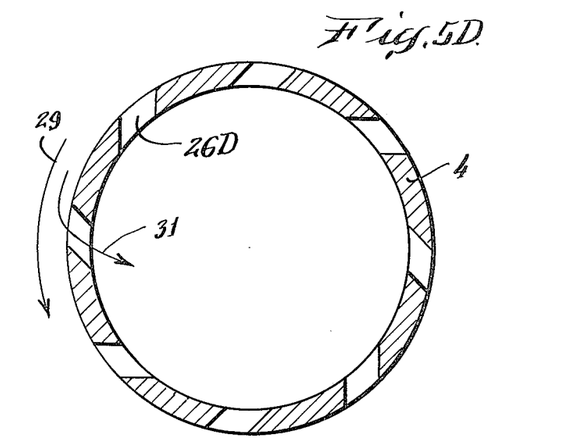
Figure 5E:
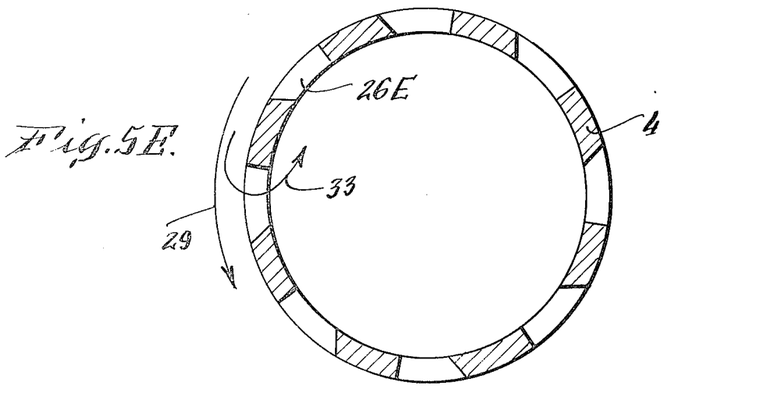

FIGS. 5A through 5E show various alternative configurations of these slots 26. Such slots may, for example, be normal (FIG. 5A), chamfered (FIG. 5B), opposed (FIG. 5C), congruent (FIG. 5D) or combined (FIG. 5E). A normal slot 26A extends inwardly perpendicular to the tangent to the swirling component of flow 29 of the gases in the annular channel 8 near the slot. An opposed slot 26C is angled inwardly in a direction which is opposite (or opposed) to the swirling component of flow 29 of the gases in the annular channel near the slot. Conversely, a congruent slot 26D is angled inwardly in a direction which is the same as the swirling component of flow 29. A chamfered slot 26B converges inwardly toward the interior of the inner tube. Slot 26E is a combination of a normal slot on one vertical side and an opposed slot on its other vertical side.

As evident from FIGS. 5A to 5E, and as will be further discussed below, the slots cause a sudden change 31 or 33 in the radial direction of flow of the gas which was previously swirling 29 around the outer periphery of the inner tube 4 and then suddenly enters the slots, thereby suddenly producing a radial component of flow. The degree of change of direction of flow and the extent of the suddenness of this change depend on the specific configuration of the slots in the separator and the positioning of the slots in the inner tube. In FIGS. 5A-5E, the swirling gas is illustrated as circulating in a couterclockwise direction 29, and the greatest change in direction of flow 33 is caused by the opposed slot configuration 26C shown in FIG. 5C and the combination slot configuration 26E shown in FIG. 5E.

In operation, gas laden with particles is introduced 35 into the open top of the annular channel 8 by the action of the swirl vanes 15 which are curved in the axial direction like turbine blades. These swirl vanes impart a swirling movement to the entering gas causing the gas to revolve around the outer periphery of the top of the inner tube 4. The centrifugal force of the swirling motion causes the larger particles to be thrown outwardly against the inner surface of the outer tube 6. Due to the action of gravitational forces and the motion of a small amount of bleed gas 27 from the bottom of the annular chamber 8, the separated larger particles descend down along the inner surface of the outer tube and pass through the narrow passageway 22. Thus, the separated particles, together with some bleed gas, enter the collection chamber 14. The discharge port 24 provides means for removing the collected material from the chamber 14.

After the initial centrifugal separation of larger particles has occurred, the swirling gas, which is continually descending in the annular channel 8 and causing further separation, reaches the proximity of the slots 26 in the inner tube. Because of the pressure differential from the top of the separator to the bottom and because the bottom of the annular channel is closed while the bottom of the inner tube is open, the swirling gas flows inwardly through the slots and into the inner tube. (In general, the pressure differential between the top and bottom of the separator 2 may be of the order of approximately 1.0 to 1.5 psi. In other words, this is the difference in pressure of the flow 35 entering the separator 2 and the flow 37 leaving this separator.)

As previously noted and shown by FIGS. 5A-5E, the shape of the slots is such that gas entering therein experiences a sudden change in radial direction of flow. This rapid change of direction of the gas stream results in a further separation of smaller particles which were not separated when the gas entered and swirled through the annular channel. These smaller particles are left behind when this sudden change in direction occurs. In other words, due to their momentum, they continue traveling in a swirling motion 29 (FIGS. 5A-5E) in the annular channel 8 when the gas flow suddenly turns inwardly 31 or 33 through the slots. Also, some particles strike the downstream sides 39 of the slots and are bounced back into the annular channel. These additionally separated particles remain in the annular channel and move towards the inner surface of the outer tube, descending into the collection chamber 14 at the bottom thereof, while the main stream of gas enters the inner tube through the slots 26. The later separated particles leave the collection chamber together with the previously separated particles through the discharge port 24, as was described above.

After all the separation stages have occurred, the main swirling clean gas stream flows through the slots and into the inner tube and descends therein, exiting as shown at 37 from the bottom of the separator through the lower open end of the inner tube.

Figure 1B:
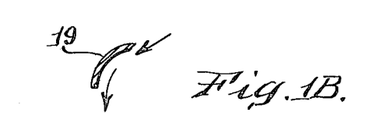
FIG. 1B shows anti-swirl vanes which may be employed.

During the above described separation, a small amount of the gas to be purified remains in the annular channel and does not pass through the slots in the inner tube. This bleed gas swirls downwardly towards the lower ridge 18, which may carry at least one anti-swirl vane 19 (FIG. 1B) for forcefully directing the flow of this gas through the passageway 22. In effect, the anti-swirl vanes 19 convert velocity head into pressure head within the small collection chamber 14, causing a pressure differential of about 0.1 to 0.15 psi between the interior of the collection chamber and the region 44 outside of the outer tube. This pressure differential prevents the coupling of the centrifugal separator with any other similar separators in the vicinity, and thus prevents the back-up of particles collected in the collection chamber through the annular channel of the separator. This pressure difference between the collection chamber 14 and the downstream region 44 also facilitates the discharge of material from the chamber.

Although the anti-swirl vanes are advantageous, they are not absolutely essential. This results from the fact that some bleed gas will enter the passageway 22 into the collection chamber 14 due to the pressure differential caused by the critical flow nozzle and the ports 24 even if no anti-swirl vanes are present.

Because the collection chamber 14 is substantially isolated from the swirling forces of the annular channel 8 above it by the ridge 18, the effect of these swirling forces on the particles collected in the collection chamber is greatly diminished. (These now diminished forces may facilitate the removal of particulate matter from the collection chamber through the ports). Also, unlike some of the noted prior art separators, the separated particles are not required to negotiate any sharp turns or to "jump" across a gap, because the entrance 22 to the collection chamber 14 is positioned directly below the inner surface of the outer tube and forms a continuation thereof without interruption or change in direction.

Thus, the present embodiment of the invention advantageously eliminates two major causes of erosion due to recycling of the separated particles that occurred in many of the prior art structures. Therefore, the presently described separators may, depending on the concentration of particles in the gas to be treated, be manufactured without lining the inner and outer surfaces of the outer and inner tubes, respectively, with an erosion reducing material (such as the expensive ceramic lining used in certain prior art units), thus markedly reducing the cost of the separators. Use of unlined tubes also provides a lighter weight vessel.

In the preferred embodiment, the clearance between the rim 20 of the ridge 18 and the inner surface of the outer tube 6 is sufficiently small so that larger particles of debris, which would obstruct the discharge port 24 if allowed entry into the collection chamber, are prevented from entering the collection chamber.

An example of the preferred dimensions of the above described new centrifugal separator is as follows. The inner diameter of the outer tube should be less than six inches and the outer diameter of the inner tube should be less than four inches. The length of both the inner and outer tubes is preferably at least three times the dimension of the inner diameter of the outer tube. The slots in the inner tube are approximately four inches long and approximately one-quarter inch wide, and in the preferred embodiment, there are six to twelve such slots.

The inner and outer tubes should preferably be long. In fact, FIG. 1 shows these tube lengths as being about six times as great as the diameter of the inner tube. The advantage of utilizing longer tubes is that they provide a longer annular channel 8, which can result in more efficient separation of particulate matter from gas as the gas swirls down the channel, prior to its entry into the slots. The longer annular channel provides a large spiral path for particulate matter and gas swirling within the annular channel.

Figure 1C:
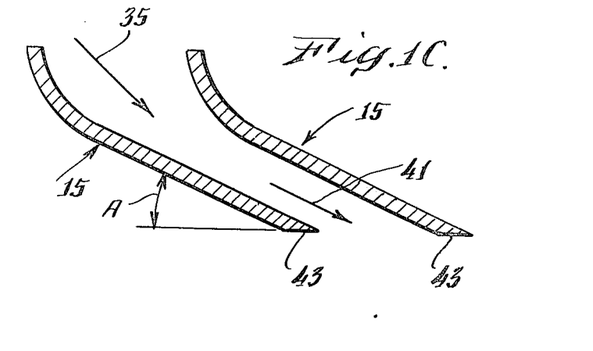
FIG. 1C shows the configuration of a swirl vane.
Figure 2:
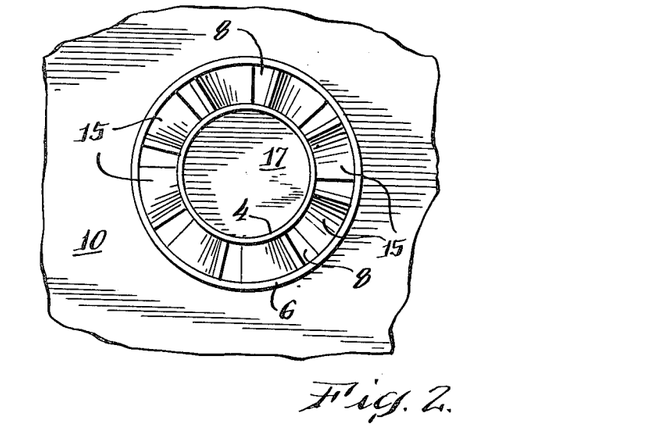
FIG. 2 shows a top plan view of the centrifugal separator of FIG. 1 illustrating a series of swirl vanes

This embodiment includes six to eight swirl vanes 15 associated with each separator. As shown on larger scale in FIG. 1C, the angle A of the downstream or discharge lip 43 of each swirl vane with the horizontal should not be greater than 30°. The spouting velocity of the swirling gas can be within the range of 100 to 250 ft./sec. The spouting velocity for larger particles should be in the lower portion of the range, while the spouting velocity for smaller particles should be in the higher portion of the range. This spouting velocity is the velocity at 41 in FIG. 1C as the gas shoots away from the downstream lip 43 of each swirl vane and into the annular channel 8 below the swirl vanes.

The width of the passageway 22 should be between $\frac{1}{8}$" and 1/16" in order to prevent larger sized particles or debris from entering the collection chamber and obstructing the discharge port 24. There are three or four of these discharge ports 24.

Figures 3, 4A, 4B:
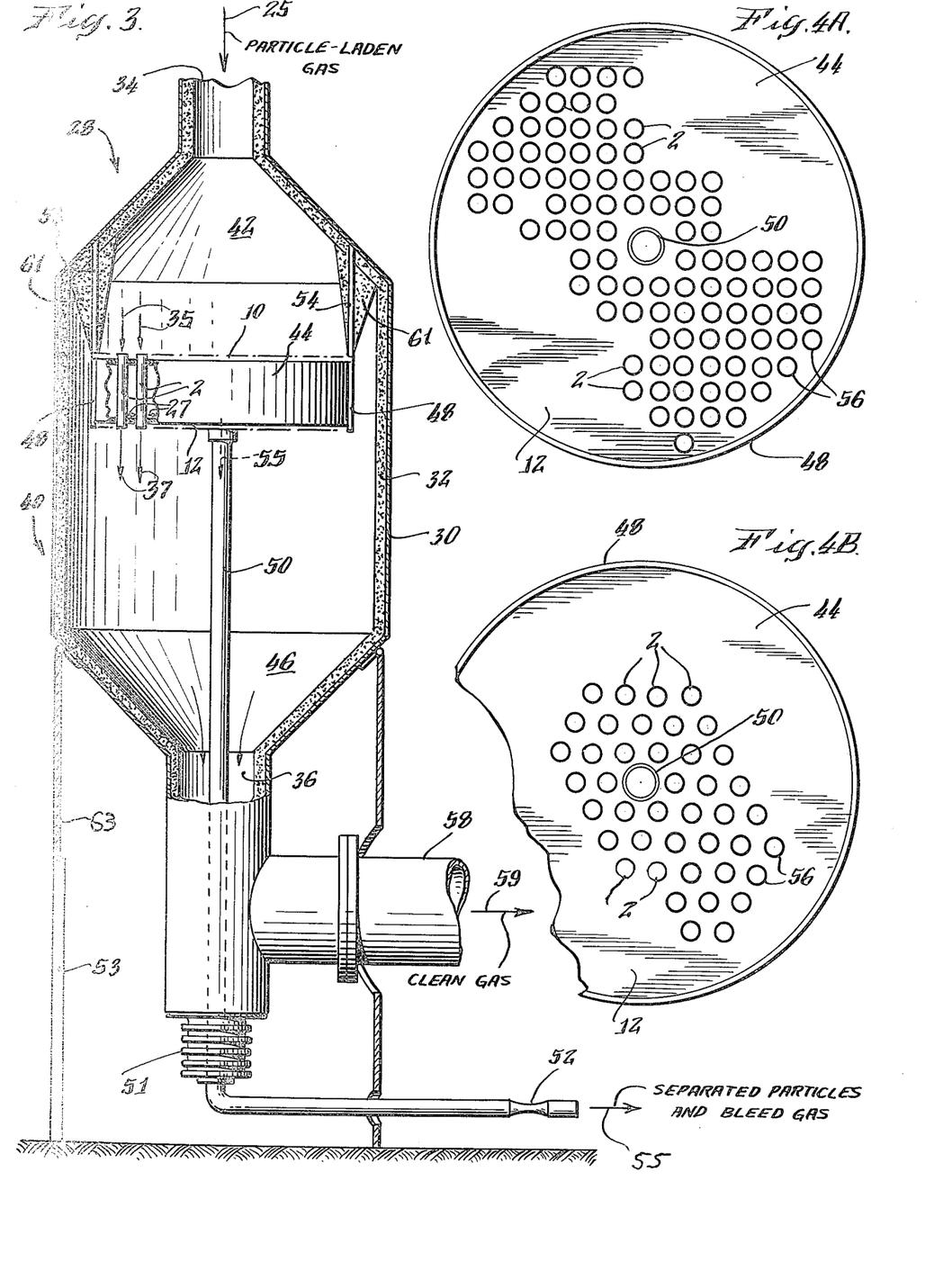

Referring to FIG. 3 of the drawings, a novel separator vessel, advantageously utilizing a plurality of the above-described new centrifugal separators, is indicated generally by the numeral 28. The vessel is defined by an outer shell 30. A layer of heat resistant insulation 32 is affixed to the interior of this outer shell.

A reduced diameter inlet passage 34 is formed at the top of the vessel and a similar necked outlet passage 36 is formed at the bottom of the vessel. A main body, generally indicated at 40, is formed between the inlet and outlet passageways.

The main body 40 of the separator vessel is shown as being generally cylindrically shaped when high internal pressure is involved, and is divided into three sections: an upper gas inlet chamber 42 positioned below the inlet passageway 34, an intermediate annular particle separation chamber 44, and a lower clean gas discharge chamber 46 which leads into the outlet passageway 36 therebelow.

The annular separation chamber 44 is defined by the upper and lower tube sheets 10 and 12 (shown in FIG. 1) and an annular sidewall 48. The separation chamber accommodates a plurality of the separators 2. The upper ends of the inner and outer separator tubes extend through openings in the upper tube sheet 10 into the gas inlet chamber 42 thereabove. The lower ends of the inner and outer separator tubes extend through openings on the lower tube sheet and into the clean gas discharge chamber 46 thereblow. Holes for accommodating the separators on the upper and lower tube sheets are in axial alignment so that the cylindrical separators stand vertically when inserted therethrough.

The discharge ports 24 of the separators 2 connect the collection chambers 14 of each of the separators with the separation chamber 44. One end of a duct 50 for carrying away the particle-laden bleed gas 27 communicates with the separation chamber 44, while its other end passes through the lower clean gas discharge outlet to join with a criticalflow nozzle 52 shown as being positioned outside of the vessel. Thus, a line of communication is formed between the interior of the individual collection chambers 14 of the separators and the exterior of the vessel for expelling particle-laden bleed gas.

The critical-flow nozzle 52 regulates the amount of bleed gas 55 discharged from the separation chamber through the duct 50. Preferably, $\frac{1}{4}$ to 2% of the gas 25 introduced into the vessel is discharged through this duct. In any event, the amount of bleed gas 55 must be sufficient to carry the load of collected particulate matter which has been deposited in the separation chamber 44 from the collection chambers of the individual separators.

Furthermore, by regulating the flow of gas from the separation chamber 44, the critical-flow nozzle controls the pressure differential between the collection chambers of the individual separators and the region external to them, as discussed above. This differential prevents coupling between the individual separators and avoids any back-up of material into these collection chambers or into the annular channel thereabove. Also, the pressure differential between the collection chambers 14 and the separation chamber 44 of the vessel facilitates the discharge of material from the collection chambers into the separation chamber, as discussed above.

An expansion-contraction accommodation bellows 51 is provided connecting the duct 50 to the neck 36. Because the operating temperature within the vessel can attain a significantly high magnitude (approximately 1300° F.), the bellows avoids undue stress on the duct by expanding and contracting. Ways for preventing accumulation of separated particles in the folds of the bellows, such as by continuous steam flushing, are known to those skilled in the art. As evident from FIG. 3, the bellows is positioned in the vessel in a location which provides ready access thereto for inspection, maintenance or replacement purposes through a removable access door 53 in the structural support wall 63.

The separation chamber is suspended and supported from the interior of the vessel by a support 54. The support can be affixed to or integral with cylindrical sidewall 48, thus, in effect, providing a basket-like structure for supporting the separation chamber 44. The support 54 is cylindrically shaped, the top thereof being affixed to the interior of the vessel 28. In FIG. 3, the top of the support 54 is affixed to the inner surface of the outer shell 30. As also shown in FIG. 3, the support 54 isolates inlet chamber 42 from outlet chamber 46, thus preventing any inlet gas and particles contained therein from by-passing the separation chamber 44.

In the alternative, support members (not shown) can be provided underneath the lower tube sheet 12 of the separation chamber 44 to support it from below. In such an embodiment, the support members would be affixed to the inside of the vessel shell 30 and would project beneath the lower tube sheet 12 for accommodating relative expansion and contraction of the various members. Also, as noted above, means to isolate the inlet chamber 42 from the outlet chamber 46 would be provided between the top of the separation chamber 44 and the vessel 28 to prevent inlet gas and particles from by-passing the separation chamber by going around its outer periphery.

The support 54 is shown as being partially insulated by the insulation 61 to reduce thermal stress therein. The insulation 61 of the support 54 is desirable because, in operation, the interior of the vessel can achieve temperatures of approximately 1300° F. while the insulated vessel shell 30 is maintained significantly colder in the range of 300° F. to 400° F.

FIG. 4 illustrates two possible arrangements of a tube sheet in accordance with the present invention. The large circular area represents the lower tube sheet 12, and the smaller circular openings 56 represent the holes in the tube sheet through which the individual separators 2 are inserted.

In operation, gas 25 laden with particles enters the gas inlet 34 and is introduced into the gas inlet chamber 42. The gas flows through the swirl vanes associated with the individual separators 2 as shown by the arrows 35 imparting a powerful swirling motion to the gas as shown by arrow 41. As previously described, particulate matter is separated from the gas, and the separated particles and some bleed gas enter into the lower collection chambers 14 of the individual separators 2. Separated particles and bleed gas contained within the collection chambers 14 of the individual separators pass out laterally through the discharge ports 24 and into the separation area 44, and are expelled from the vessel through the duct 50 and nozzle 52, as indicated by the arrow 55.

The clean gas 37 exits the separators downwardly through the open bottom portion of the inner separator tube 4, enters the clean gas discharge chamber 46 directly from the bottoms of the individual separators, and passes through the discharge outlet 36 into an outflow conduit 58, as shown by the arrow 59.

As is now evident, the use of the separators shown in FIG. 1 (in which clean gas is discharged downwardly from the bottom of the separator and the separated particles are discharged laterally from the separators) in the vessel of FIG. 3 advantageously enables the uppermost region of the vessel to act as a particle laden gas inlet chamber. This was not possible in the prior art separating vessels because those separators discharged the clean gas upwardly, thus requiring the uppermost chamber to be used as a clean gas discharge area. This necessitated the use of duct means to transport incoming gas through this upper chamber to the center separation chamber of the vessel and complicated the arrangement of connecting piping.

In the FIG. 3 embodiment of the present invention, the above mentioned duct means of the prior art have advantageously been eliminated because use of the new separators allows the upper chamber of the vessel to be used as the gas inlet chamber. Elimination of the prior art inlet ducts reduces the cost of construction and manufacture of the vessel.

Also, the vessel is easier to repair and maintain because access to the separator tubes is unobstructed by the inlet ducts and partitions of the prior art.

Because the separated particles are discharged laterally from the individual separators, the clean gas can advantageously exit from the bottom of the separators in a downward direction, yet avoid remixing with the separated particles. This assures that the gas in the vessel flows in a downward direction from the time it enters the vessel until it exits therefrom. In contrast, the known prior art vessels admitted incoming gas in a downward direction, discharged the purified gas in an upward direction, and discharged the separated particles in a downward direction.

Thus, the disclosed embodiment of the present invention provides a less complicated vessel because the main stream of gas is always flowing in a downward direction, unlike the prior art in which the gas enters the vessel in a downwardly direction but exits therefrom in an upwardly direction. Increased efficiency results from the use of a plurality of separators comprising long, narrow tubes. Furthermore, as previously explained, efficiency of operation is enhanced by the novel separators which provide more distinct stages of separation than is provided by the prior art embodiments.

The separator tubes themselves form struts between the tube sheets increasing the strength of the structure markedly and permitting lighter weight and low cost construction. These tube sheets can withstand the large forces associated with the incoming and outgoing flowing gas. At the same time, the arrangement of the tube sheets and individual separators defines the separation chamber 44 of the separating vessel 28.

It is believed that the many advantages of this invention will now be apparent to those skilled in the art. It is also apparent that a number of variations and modifications may be made in this invention without departing from its scope and spirit. Accordingly, the foregoing description is to be construed as illustrative only, rather than limiting. The invention is limited only by the following claims and all equivalents thereto.

I claim:

1. A centrifugal separator for separating particulate matter from downflowing gases, said separator comprising:

a vertical outer tube having an inner and outer surface, a vertical inner tube having an inner and outer surface, said inner tube being of a diameter of less than that of said outer tube, said inner tube being positioned within said outer tube and extending in the longitudinal direction within said outer tube with said outer surface of said inner tube and said inner surface of said outer tube defining an annular channel therebetween, said inner tube having a plurality of longitudinally extending slots therein in the lower portion of said inner tube for providing communication between said annular channel and the space within said inner tube, said slots being dimensioned and positioned so that gas swirling in circumferential direction around said inner tube in said annular channel and then turning inwardly and entering through said slots into said inner tube experiences a sudden change from a circumferential direction of flow to a radially inward direction of flow, first closure means for sealing the top of said inner tube, and second closure means positioned proximate to the bottom of said annular channel for sealing the bottom of said annular channel, said inner tube being closed at the top and open at the bottom and said annular channel being open at the top and closed towards the bottom, means positioned and arranged with respect to said annular channel for swirling a stream of gas containing particulate matter flowing down in said annular channel above said slots, said first and second closure means defining a path of flow of said stream of swirling gas in said annular channel, said gas swirling down through said annular channel above said slots, and then suddenly flowing inwardly through said slots into said inner tube, and down through the open bottom of said inner tube, said particulate matter in said swirling gas in said annular channel being separated from said gas by the force of centrifugal force thrusting said particulate matter outwardly against said inner wall of said outer tube (i) when said gas begins swirling in said annular channel and (ii) as said gas swirls down through said annular channel above said slots, and (iii) a further separation of particulate matter occurring as a result of said sudden change in direction of flow of said swirling gas upon entering said slots, said separated particulate matter remaining in said annular channel for subsequent removal along with bleed gas from the lower portion of said channel, and said swirling gas stream exiting from said separator by flowing downwardly and out through the bottom of said inner tube.

2. A centrifugal separator as claimed in claim 1 further including:
an annular ridge positioned within said annular channel and above said second closure means, the inside of said annular ridge being affixed to said outer surface of said inner tube, the outside of said annular ridge being closely spaced from said inner surface of said outer tube for defining a narrow passageway between said annular ridge and said outer tube,
said second closure means, said annular ridge, said inner surface of said outer tube, and said outer surface of said inner tube defining an annular collection chamber towards the bottom of said annular channel, and
said separator having at least one discharge port communicating with said collection chamber for discharging bleed gas and particulate matter from said collection chamber.

3. A centrifugal separator as claimed in claim 1, 2 wherein said slots in said inner tube are in the lower half of said inner tube.

4. A centrifugal separator as claimed in claim 2 further including means for controlling the amount of said bleed gas discharged from said collection chamber through said at least one discharge port, said controlling means including a critical flow nozzle positioned downstream from said at least one discharge port and communicating therewith.

5. A centrifugal separator as claimed in claim 1, 2 or 3 wherein the axial length of said annular channel above said slots in said inner tube is at least three times greater than the diameter of said inner tube.

6. A separator as claimed in claim 2 wherein said annular ridge extends in a direction transverse to said inner and outer tubes.

7. A centrifugal separator as claimed in claim 2 wherein said annular ridge is sloped downwardly in a radially outward direction relative to the surfaces of said inner and outer tubes.

8. A centrifugal separator as claimed in claim 1, 2 or 3 wherein said inner tube has six to twelve of said slots in its wall, said slots extending longitudinally in the wall of said inner tube and having a length greater than the diameter of said inner tube and a width of approximately one-quarter of an inch.

9. A centrifugal separator as claimed in claim 8 wherein each of said slots has one edge normal to a tangent to the swirling direction of the gas in said annular channel.

10. A centrifugal separator as claimed in claim 8 or 9 wherein each of said slots has a downstream edge which is chamfered on the outside.

11. A separator as claimed in claim 1 wherein said means for swirling gas in said annular channel includes a plurality of swirl vanes positioned in the upper portion of said annular channel towards the top of said separator.

12. A separator as claimed in claim 1 wherein said inner tube is concentrically positioned within said outer tube and is substantially longitudinally coextensive therewith.

13. In a centrifugal separator having an outer tube, an inner tube positioned within said outer tube and extending in the longitudinal direction within said outer tube, said inner and outer tubes extending vertically and defining an annular channel extending downwardly therebetween, and swirling means at the top of said annular channel for swirling a downwardly flowing stream of gas having particulate matter in said annular channel, said gas swirling in a direction around said inner tube while flowing downwardly in said annular channel, the improvement comprising:
first closure means sealing the top of said inner tube,
second closure means sealing the bottom of said annular channel,
a plurality of slots in said inner tube providing communication between said annular channel and the space defined within said inner tube,
said slots being positioned in a lower portion of said inner tube and extending longitudinally in said tube for causing swirling gas in said annular channel to experience a sudden change in direction of flow during entry of said gas into said slots during flow of said gas into said inner tube,
particulate matter in said stream of gas being initially separated from said gas and propelled against the inner surface of said outer tube by centrifugal force generated by said swirling motion of said gas when said gas is first swirled in said annular channel and as said gas swirls downwardly through said annular channel above said slots,
further particulate matter being separated from said gas by said sudden change in direction of flow of said gas when said gas enters said slots,
wall means defining a collection chamber communicating with said annular channel below said slots, said wall means defining a small passageway from said annular channel into said collection chamber,
said centrifugal separator having a discharge port from said collection chamber to the exterior of said separator for discharging bleed gas plus the separated particulate matter from said collection chamber, and
said inner tube being open at the lower end for allowing the cleaned gas which has entered through said slots into said inner tube to exit in a downward direction from the lower end of said inner tube.

14. A centrifugal separator as claimed in claim 13 in which said wall means defining said collection chamber include an annular ridge secured to the outside surface of said inner tube below said slots,
said annular ridge extending radially outwardly toward the inside surface of said outer tube,
said annular ridge having a periphery closely spaced from the inside surface of said outer tube forming a narrow passageway between the periphery of said annular ridge and said outer tube.

15. A centrifugal separator as claimed in claim 14 in which:
a plurality of anti-swirl vanes are mounted on the periphery of said annular ridge and project into said narrow passageway for converting the velocity head in the swirling gas in said annular channel into pressure head in said collection chamber for causing the interior of said collection chamber to have a higher pressure than the lower portion of said annular channel.

16. A centrifugal separator as claimed in claim 13, 14 or 15 wherein the length of each of said inner and outer tubes extending along said annular channel above said slots is at least three times greater than the diameter of said inner tube.

17. A centrifugal separating vessel for separating particulate matter from gases to be purified, said vessel including:
   a main housing including a gas inlet passageway positioned at the top thereof and a gas outlet passageway positioned at the bottom thereof,
   partition means within said housing defining an upper gas inlet chamber, an intermediate separation chamber, and a lower clean gas discharge chamber,
   said upper gas inlet chamber being adjacent to and communicating directly with said gas inlet passageway thereabove, said lower clean gas discharge chamber being adjacent to and communicating directly with said gas outlet passageway therebelow,
   said partition means including upper and lower tube sheets defining said separation chamber between them,
   a plurality of centrifugal separators extending vertically through both of said tube sheets and through the separation chamber between said sheets, each of said separators including an inner and an outer tube, said inner tube having an outside diameter less than the inside diameter of said outer tube and extending vertically coaxially within said outer tube for providing an annular channel between said tubes, said inner tube being closed at the top and open at the bottom, said annular channel being open at the top and closed at the bottom, said inner tube having a plurality of longitudinally extending slots therein providing communication between the lower portion of said annular channel and the interior of said inner tube,
   said open tops of said annular channels in said separators communicating directly with said inlet chamber for admitting particle-laden downflowing gas from said inlet chamber into each of said annular channels,
   a plurality of swirl vanes in the open top of each separator for causing the particle-laden gas in said channel to swirl around the inner tube as the particle-laden gas flows downwardly through said channel for separating particles from the swirling gas by centrifugal effect,
   further separation of particles from the swirling gas occurring as the swirling gas suddenly turns inwardly flowing through said slots into the interior of the inner tube,
   said open bottoms of said inner tubes in said separators communicating directly with said lower clean gas chamber,
   means for expelling separated particles and bleed gas from the bottom of the annular channels of said separators communicating with said intermediate separation chamber of said separator vessel to discharge particles and bleed gas therein, and
   duct means communicating with the bottom of said separation chamber for carrying away the bleed gas and separated particles,
   wherein said gas to be purified is introduced into the vessel at the upper gas inlet chamber, flows downwardly through the plurality of centrifugal separators extending vertically through said intermediate separation chamber where it is purified, and exits downwardly from said separators passing through said lower clean gas discharge chamber in a downwardly direction and out said outlet passageway.

18. A centrifugal separating vessel as claimed in claim 17 in which:
   said means for expelling separated particles and bleed gas from the bottom of the annular chambers of said separators includes a discharge port in each of said separators communicating with said intermediate separation chamber, and
   a critical flow nozzle in said duct means for controlling the total mass flow of bleed gas and separated particles for controlling the flow of bleed gas and separated particles through each of said discharge ports from the respective centrifugal separators.

19. A centrifugal separating vessel as claimed in claim 17 or 18 wherein said intermediate separation chamber which is defined between said upper and lower tube sheets is strengthened by said plurality of centrifugal separators being secured to said upper and lower tube sheets adding structural support to said intermediate separation chamber.

20. A centrifugal separating vessel as claimed in claim 19 further including means solely connected to the perimeter of said upper and lower tube sheets for supporting said upper and lower tube sheets defining the intermediate separation chamber solely from the perimeter as a basket-like structure, and means for heat insulating said supporting means for said intermediate separation chamber, whereby said downflow separators enable a simplified structure and said downflow separators connected to said upper and lower tube sheets act as stiffening struts for enabling the entire basket-like structure to be relatively lightweight but strong.

21. A centrifugal separating vessel as claimed in claim 17, 18, 19, 20 wherein each of said plurality of centrifugal separators further includes:
   an annular ridge positioned within said annular channel below said slots and spaced above the bottom of said annular channel, said annular ridge being affixed to the outer surface of said inner tube, said annular ridge extending in a direction towards the inner surface of said outer tube, the periphery of said annular ridge being closely spaced from the inside surface of said outer tube for providing a narrow passageway between said outer tube and the periphery of said annular ridge,
   said annular ridge, the inner surface of said outer tube, and the outer surface of said inner tube defining a collection chamber towards the bottom of said annular channel,
   said narrow passageway leading down from said annular channel into said collection chamber such that particles separated from said swirling gas descend down said annular channel, through said narrow passageway, and into said collection chamber, and
   said means for expelling separated particles and bleed gas from the respective separators providing communication between the individual collection chambers of the respective separators and said separation chamber between said tube sheets.

22. A centrifugal separating vessel as claimed in claim 18 in which:
said duct means extends vertically down through said clean gas discharge chamber, and
said duct means is connected to said vessel through an expansion and contraction bellows.

23. A method of separating particulate matter from gases, said method using a vertical outer tube and a vertical inner tube having a plurality of axially extending slots therein, said inner tube being positioned concentrically within said outer tube such that a vertical annular channel is defined between the outer surface of said inner tube and the inner surface of said outer tube, said method including the steps of:
introducing a stream of gas containing particulate matter into said annular channel,
causing said stream of gas to swirl in a circumferential direction around said inner tube as the stream flows downwardly in said annular channel such that larger particles of particulate matter are thrust against the inner surface of said outer tube by centrifugal force of said swirling gas,
allowing the swirling gas to flow downwardly in said annular channel for causing additional particles to be flung against the inner surface of the outer tube such that said additional particles are separated from the stream of gas,
thereafter directing the flow of said swirling gas inwardly through said slots in said inner tube passing into the interior of said inner tube such that said swirling gas experiences a sudden change in direction of flow in entering said slots so that further particles are separated and temporarily remain in said annular channel while said swirling gas enters the interior of said inner tube,
discharging said stream of gas downwardly from the interior of said inner tube and
removing the separated particulates together with bleed gas from the lower end of said annular channel.

24. A centrifugal separator for separating particulate matter from gas, said separator comprising:
an elongated outer cylindrical tube;
an elongated inner cylindrical tube having an outside diameter (O.D.) less than the inside diameter (I.D.) of said outer tube;
said inner tube extending longitudinally within said outer tube and being positioned concentrically within said outer tube;
said inner tube having an O.D. approximately ⅔rds of the I.D. of sid outer tube;
said concentric outer and inner tubes extending vertically and defining an elongated vertical annular channel therebetween;
the upper end of said inner tube being closed;
the lower end of said annular channel being closed;
said inner tube having a plurality of circumferentially spaced slots therein;
said slots being positioned in the lower part of the inner tube for defining a long annular channel above the upper ends of said slots;
the lower ends of said slots being positioned above the closed lower end of said annular channel;
swirl means positioned and arranged with respect to the upper end of said annular channel for causing the particle-laden gas entering the upper end of said annular channel to swirl vigorously around the axes of said tubes as the gas flows down through said long annular channel above said slots;
thereby providing a first stage of separation as the particle-laden gas is initially swirled by said swirl means as the gas enters the upper end of said annular channel and
thereby providing second stage of separation as the gas swirls down through the long annular channel and makes further revolutions therein before reaching the upper ends of said slots for causing the gas to become partially purified before reaching the upper ends of said slots, with the separated particles descending down along the inner surface of the outer tube;
the partially purified swirling gas then taking a sudden change in direction of flow as the gas enters and passes through said slots into the interior of said inner tube;
thereby providing a third stage of separation as said partially purified gas takes said sudden change in direction causing smaller particles which were not separated from the gas in said first two stages of separation to remain within the annular channel for removal therefrom while the main flow of gas enters through said slots into the inner tube;
the clean gas flowing down through said inner tube and being discharged from the lower end of said inner tube; and
said annular channel having an outlet therefrom at the lower end of said annular channel for removing the collected particles from said channel.

25. A centrifugal separator for separating particulate matter from gas as claimed in claim 24, in which:
a ridge is provided on the inner tube positioned below the lower ends of said slots and above the closed lower end of said annular channel;
said ridge extending circumferentially around the inner tube and projecting out closely adjacent to the outer tube defining a narrow annular passageway between the inner surface of the outer tube and the perimeter of said ridge for allowing the collected particles to be removed from the lower end of said annular channel through said narrow passageway;
a chamber being provided below said ridge, said chamber being defined by said ridge, the closed lower end of said annular channel and the portions of said inner and outer tubes extending between said ridge and said closed lower end; and
said chamber having at least one exit port therefrom for discharging the collected particles through said port together with a minor proportion of the gas.

26. A centrifugal separator for separating particulate matter from gas as claimed in claim 25, in which:
anti-swirl vanes are positioned in said narrow annular passageway for converting the velocity head of the swirling gas in the lower end of said annular channel into pressure head in the chamber below said ridge.

27. A centrifugal separator for separating particulate matter from gas as claimed in claim 25 or 26, in which:
said at least one exit port from said chamber is sufficiently small for providing a pressure drop of between 0.1 and 0.15 pounds per square inch for isolating pressure variations in said annular channel from the region downstream from said at least one exit port for preventing any flow reversal through said at least one exit port thereby preventing any back-up of particles and facilitating the discharge of collected particles from the chamber near the closed lower end of said annular chamber through said at least one exit port regardless of pressure variations in said annular channel.

28. A centrifugal separator for separating particulate matter from gas as claimed in claim 24, 25 or 26, in which:
said swirl means are a plurality of circumferentially spaced swirl vanes positioned in the upper end of said annular channel;
each of said swirl vanes having a discharge lip at its downstream end; and
the angle "A" between said discharge lip and the horizontal is no greater than 30° at the portion of said discharge lip adjacent to the wall of the outer tube.

29. A separator vessel for containing a plurality of centrifugal separator tube units for separating particulate matter from a gas to be purified comprising:
a main housing having a gas inlet passageway positioned at the top and a clean gas outlet passageway positioned at the bottom;
a pair of vertically spaced tube sheets;
support means in said main housing for supporting said pair of tube sheets extending across the interior of said housing for separating the interior of said housing into an upper chamber communicating with said inlet passageway for receiving the particle-laden gas and a lower chamber communicating with said outlet passageway;
said tube sheets being vertically spaced apart forming an intermediate chamber between said tube sheets, said intermediate chamber being located between said upper and lower chambers;
a plurality of centrifugal separator tube units extending vertically through both of said tube sheets, said centrifugal separator tube units being of the type in which the particle-laden gas enters the upper end thereof and clean gas is discharged from the lower end thereof;
the upper ends of said centrifugal separator tube units being positioned in said upper chamber and the lower ends of said tube units being positioned in said lower chamber;
said tube units each being secured to both of said tube sheets for forming a rigid truss-like structure which strongly resists downward bending, sagging or distortion;
whereby said tube sheets can be formed of relatively thin metal;
said centrifugal separator tube units being of the type in which the collected particles together with bleed gas exit therefrom through at least one exit port intermediate the upper and lower end of the tube unit;
said at least one exit port of the centrifugal separator tube units opening into said intermediate chamber;
a duct connected to the bottom of said intermediate chamber for carrying away the collected particles together with the bleed gas;
said duct including a critical flow nozzle for controlling the total mass flow of bleed gas flowing from said intermediate chamber through said duct; and
said total mass flow being sufficient for carrying away the particulate matter from said intermediate chamber.

30. A separator vessel as claimed in claim 29, in which:
said critical flow nozzle being constructed and arranged to control said total mass flow of bleed gas to be between $\frac{1}{4}\%$ and 2% of the total amount of gas entering the vessel through said inlet passageway.

31. A downflow centrifugal separator for separating particulate matter from gas, said downflow separator comprising:
an elongated outer cylindrical tube;
an elongated inner cylindrical tube having an outside diameter (O.D.) less than the inside diameter (I.D.) of said outer tube;
said inner tube extending longitudinally within said outer tube and being positioned concentrically within said outer tube;
said concentric outer and inner tubes being vertical and defining an elongated vertical annular channel therebetween having an axial length at least six times said I.D. dimension of said outer tube;
the upper end of said inner tube being closed and the lower end of said inner tube being open;
the lower end of said annular channel being closed;
a plurality of swirl vanes near the upper end of said annular channel for rapidly swirling the particle-laden gas entering the upper end of said annular channel around said common axis of said downflow separator for providing a first stage of separation of particles;
said inner tube having a plurality of circumferentially spaced axially extending slots therein;
the upper ends of said slots being positioned below the longitudinal center of the inner tube for defining a long annular channel above the upper ends of said slots for providing a second stage of separation of particles as the swirling gas flows down through said long annular channel above said slots;
the lower ends of said slots being positioned above the closed lower end of said annular channel;
said axially extending slots defining an abrupt change in direction for the gas swirling in said annular channel for causing the partially purified swirling gas to take a sudden change in direction of flow as the gas enters through said slots into the interior of said inner tube for providing a third stage of separation as said partially purified gas takes said sudden change in direction for causing smaller particles which were not separated from the gas in said first two stages of separation to be left within the annular channel while the main flow of gas enters through said slots into the inner tube;
the purified gas flowing down through said inner tube and being discharged downwardly from the open lower end of said inner tube;
the closed lower end of said annular channel having a chamber for collecting the particles which were separated in said three stages and which have traveled down through said annular channel; and
at least one outlet port from said chamber for removal of the collected particles.

32. A centrifugal separator for separating particulate matter from flowing gases having a gas inlet and a gas outlet portion, said separator comprising:
an outer tube having an inner and an outer surface,
an inner tube having an inner and an outer surface of a diameter less than said outer tube being positioned within said outer tube and extending longitudinally within said outer tube for forming an elongated annular channel between said tubes, a first end of said annular channel being open for communicating with said gas inlet portion, means for closing the second end of said annular channel, means for closing a first end of said inner tube, said inner tube closing means being located near said gas inlet portion, the second end of said inner tube being open for communicating with said gas outlet portion, means for swirling a stream of gas passing through said gas inlet portion into said first end of said annular channel, said inner tube having a plurality of openings therein communicating between said annular channel and the interior of said inner tube, said plurality of openings being positioned in said inner tube nearer to said closed second end of said annular channel than to said swirling means for providing an elongated annular channel between said swirling means and said openings, a ridge positioned within said annular channel between said openings and said closed second end, said ridge tightly surrounding said outer surface of said inner tube and extending outwardly from said inner tube to a position close to the inner surface of said outer tube for forming a narrow annular passageway between said annular ridge and said inner surface of said outer tube, whereby said means for closing said second end of said annular channel, said ridge, said inner surface of said outer tube and said outer surface of said inner tube cooperate to provide surfaces that define a collection chamber located near said closed second end of said annular channel for receiving particles passing through said narrow passageway into said collection chamber, and means for removing particulate matter together with bleed gas from said collection chamber including a discharge port in one of said surfaces that define said collection chamber, said discharge port leading to the exterior of said separator.

33. In a centrifugal separator having a gas inlet, a vertically positioned outer tube, a vertically positioned inner tube extending longitudinally within said outer tube for defining an annular space therebetween, and means adjacent the top of said annular channel and communicating with said gas inlet for swirling a downwardly flowing particulate-containing stream of gas in said annular channel in a downward direction around said inner tube, the improvement comprising:

said inner tube extending within substantially the full length of said outer tube for defining an elongated annular channel between said inner and outer tubes, top closure means for closing the top of said inner tube, bottom closure means for closing the bottom of said elongated annular channel, a ridge encircling said inner tube contiguous with said inner tube and extending out from said inner tube close to said outer tube for defining a narrow passageway between said outer tube and said ridge, said ridge being positioned near to but above said bottom closure means for defining a collection chamber below said ridge located between said bottom closure means and said ridge, a plurality of openings in said inner tube communicating between said annular channel and the space within said inner tube, said openings being positioned in said inner tube near to said ridge for providing an elongated annular channel extending down from said swirling means above said openings, said separator having a discharge port from said collection chamber to the exterior of said separator for discharging bleed gas plus separated particulate matter from said collection chamber, and the lower end of said inner tube being open for flowing clean gas downwardly from the space within said inner tube and out of said centrifugal separator.

34. In a centrifugal separator having a gas inlet and outlet, a vertically positioned outer tube, a vertically positioned inner tube extending longitudinally within said outer tube for defining an annular channel therebetween, and means adjacent the top of said annular channel and communicating with said gas inlet for swirling a downwardly flowing particulate-containing stream of gas in said annular channel in a downward direction around said inner tube, the improvement comprising:

a ridge encircling said inner tube contiguous with said inner tube and extending out from said inner tube close to the outer tube for defining a narrow annular passageway between said outer tube and said ridge, said narrow annular passageway communicating with the opposite end of said annular channel from said gas swirling means for allowing particulate particles and bleed gas to pass from said annular channel through said narrow annular passageway, means defining a collection chamber communicating with said narrow annular passageway for receiving the particulate matter and bleed gas passing therethrough, said collection chamber having a discharge port therefrom for discharging bleed gas together with particulate matter from said collection chamber, said inner tube having openings therein near to said ridge for allowing clean gas to pass from said annular channel through said openings into said inner tube, and the interior of said inner tube communicating with said outlet for flowing the clean gas out of said separator.

35. In a separator vessel having a housing for containing a plurality of centrifugal separators for separating particulate matter from a gas to be purified with an inlet into said housing for feeding particulate-containing gas into said housing and with an outlet for feeding clean gas out of said housing, the improvement comprising:

an upper tube sheet in said housing being mechanically secured to an outer tube of each of said centrifugal separators with the outer tubes of said separators extending vertically, each of said separators having an inner tube extending vertically concentrically within the respective outer tubes and being mechanically connected to the respective outer tube, said inner tubes being at least as long as said outer tubes for forming an elongated channel in each of said separators between the inner and outer tubes with the annular channels of the respective separators communicating with the region in the housing above said upper tube sheet and with said inlet into said housing feeding into said region above said upper tube sheet and with means for swirling the particulate-containing gas flowing in the annular channels of said separators, a lower tube sheet in said housing positioned below said upper tube sheet being mechanically secured to each of said separators for mechanically interconnecting said upper and lower tube sheets through the respective separators in truss-like manner, the inner tube in each of said separators being open at its lower end and having openings communicating with the lower end of the annular channel for causing the swirling gas in the lower end of the annular channel to enter the inner tube through said openings and thereafter be discharged from the open lower end of the inner tube, and means for removing particulate matter and bleed gas from the lower ends of the annular channels of said separators.

* * * * *